United States Patent
Liu et al.

(10) Patent No.: US 10,157,482 B2
(45) Date of Patent: Dec. 18, 2018

(54) RECONSTRUCTING PET IMAGE

(71) Applicant: Shenyang Neusoft Medical Systems Co., Ltd., Shenyang (CN)

(72) Inventors: Shaolian Liu, Shenyang (CN); Ming Li, Shenyang (CN); Zhipeng Sun, Shenyang (CN)

(73) Assignee: SHENYANG NEUSOFT MEDICAL SYSTEMS CO., LTD., Shenyang (CN)

( * ) Notice: Subject to any disclaimer, the term of this patent is extended or adjusted under 35 U.S.C. 154(b) by 165 days.

(21) Appl. No.: 15/372,416

(22) Filed: Dec. 8, 2016

(65) Prior Publication Data
US 2017/0186193 A1 Jun. 29, 2017

(30) Foreign Application Priority Data
Dec. 28, 2015 (CN) .......................... 2015 1 1005331

(51) Int. Cl.
G06T 11/00 (2006.01)

(52) U.S. Cl.
CPC ........ G06T 11/005 (2013.01); *G06T 2210/41* (2013.01)

(58) Field of Classification Search
CPC ... G06T 7/0012; G06T 11/003; G06T 11/005; G06T 2207/10104; G06T 2210/41; A61B 5/0033; A61B 6/037; A61B 6/5205; A61B 6/5258; A61B 6/5282
See application file for complete search history.

(56) References Cited

U.S. PATENT DOCUMENTS

| | | |
|---|---|---|
| 2003/0161521 A1 | 8/2003 | Newport et al. |
| 2011/0142367 A1 | 6/2011 | Stearns et al. |
| 2012/0070050 A1 | 3/2012 | Panin |
| 2014/0153803 A1 | 6/2014 | Noda |
| 2014/0328530 A1 | 11/2014 | Lee et al. |
| 2014/0334702 A1 | 11/2014 | El Fakhri et al. |

FOREIGN PATENT DOCUMENTS

| | | |
|---|---|---|
| CN | 102037495 A | 4/2011 |
| CN | 102439626 B | 12/2013 |
| CN | 104335247 A | 2/2015 |
| EP | 2360643 A1 | 8/2011 |
| WO | 2013113709 A1 | 8/2013 |

*Primary Examiner* — Andrew W Johns
(74) *Attorney, Agent, or Firm* — Kilpatrick Townsend & Stockton LLP

(57) ABSTRACT

A PET image reconstruction method and device are provided. According to an example, a first diffusion expression representing a diffusion degree of projection data from a first incident point to a first crystal may be obtained with a first diffusion distribution, a second diffusion distribution, a point source position and position information of the first crystal in a projection direction. A second diffusion expression representing a diffusion degree of projection data from a second incident point to a second crystal may be obtained with the first diffusion distribution, the second diffusion distribution, the point source position and position information of the second crystal in the projection direction. A diffusion relationship representing a correspondence relationship between the point source position and projection data in the projection direction may be obtained with the first diffusion expression and the second diffusion expression. A PET image may be reconstructed according to the diffusion relationship.

20 Claims, 8 Drawing Sheets

RECONSTRUCTING PET IMAGE

BACKGROUND

The present disclosure is directed to a method and a device for reconstructing a PET (Positron Emission Computed Tomography) image.

PET may be a commonly-used medical imaging technology. In PET technology, essential substances of biological metabolism may be marked with radioactive nuclides, and the radioactive nuclides may release a positron during a decay process. After the positron moves a smaller distance, such as 1 mm, an annihilation event may occur after the positron meets an electron, thereby generating a photon pair with an approximately opposite direction. Therefore, a 3D image of the radioactive nuclides distribution, e.g., a PET image, may be reconstructed by detecting the photon pair based on projection data obtained by a crystal, thereby obtaining position information of the radioactive nuclides accumulated in the biological metabolism so as to reflect the metabolism activity.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

BRIEF DESCRIPTION OF DRAWINGS

The details of one or more embodiments of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

Figure 1:
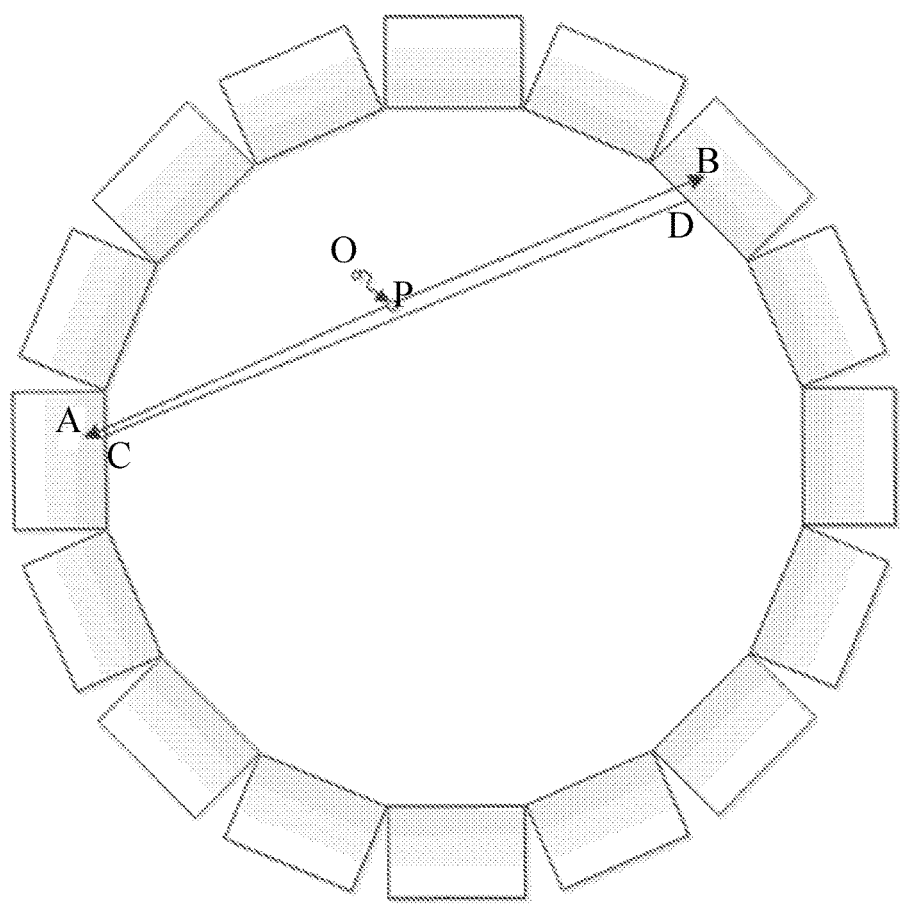
FIG. 1 is a schematic diagram of a crystal array of a PET system.

When reconstructing a PET image, a point diffusion phenomenon may occur due to reasons such as an annihilation range of a positron, a non-collimation of photon pair, and penetration and scattering of photon in a crystal. Referring to FIG. 1, which is a schematic diagram of a crystal array of a PET system. For example, as shown in FIG. 1, a point source capable of generating a positron may be placed at a point O, and an annihilation event may occur when the positron moves to a point P. Two photons may be generated. These two photons may be detected after they move to a crystal array (which is usually in a circumferential arrangement) shown in FIG. 1. Theoretically, these two photons may have photoelectric effects and may be detected at point A and point B. But in fact, it's possible to detect these two photons at point C and point D. Due to a large number of positrons have the above-described situation, corresponding projection data may behave as spreading a curve into a band when detecting a point source, and a reconstructed image may behave as spreading a point into a ball, thereby affecting the resolution and contrast of the reconstructed image. In order to solve the point diffusion problem, a correction may be performed on projection data or the reconstructed image for a point diffusion, which may be explained in following descriptions, respectively.

A reconstruction method for a correction of projection data may be explained as follows. An image x' may be reconstructed according to a relationship y'=Mx', where y' may represent projection data, and M may represent a diffusion matrix, e.g., a system matrix containing diffusion information. Since projection data y' may be measured, the diffusion matrix M may be obtained. A process for obtaining the diffusion matrix M may include: placing a point source at $x_j'$ so as to obtain corresponding projection data $y_j'$; obtaining a diffusion distribution f(σ) according to the point source position $x_j'$ and projection data $y_j'$, where f(σ) may represent the diffusion distribution of the point source on projection data in a projection direction, and σ may be a parameter of the diffusion distribution f(σ). Through repeating the above process, a large number of point source positions and corresponding diffusion parameters may be obtained, such that a correspondence relationship between the point source position and the diffusion parameter may be fitted. A diffusion parameter corresponding to each of the point source positions may be obtained according to the correspondence relationship, thereby obtaining the diffusion matrix in the projection direction. A complete diffusion matrix M may be obtained according to the diffusion matrix in a projection direction or a plurality of projection directions by using symmetry of a PET system.

A reconstruction method for a correction of the reconstructed image may be similar to the above method. A difference between the correction on the reconstructed image and the correction on projection data may be that the diffusion distribution of the point source on the reconstructed image may be fitted according to projection data. Therefore, a large number of point source positions and corresponding diffusion parameters may be obtained for fitting the correspondence relationship between the point source position and the diffusion parameter in order to reconstruct the PET image according to the correspondence relationship.

Obviously, both of the above two reconstruction methods may need to measure a large number of point source positions and corresponding diffusion parameters for fitting the correspondence relationship between the point source position and the diffusion parameter, which may be a heavy workload.

In an example in accordance with the present disclosure, a method and a device for reconstructing a PET image may be provided in order to realize a correction on a point diffusion without measuring a large number of point source positions and corresponding diffusion parameters, thereby effectively reducing workload.

The present disclosure may include, but are not limited to: analysing reasons of occurrence of the point diffusion phenomenon, and separately performing a correction on the point diffusion phenomenon caused by different reasons. Not only the correction accuracy may be effectively improved, but also measuring a large number of point source positions and corresponding diffusion parameters may be not required, thereby greatly reducing workload.

In the following, three major reasons which cause the point diffusion phenomenon are explained first.

A first reason may be an annihilation range of a positron. As shown in FIG. 1, after the positron are generated at a point O and moves for a smaller distance, such as 1 mm, an annihilation event may occur at a point P. A distance between the point O and the point P may represent the annihilation range of the positron.

A second reason may be the non-collimation of photon pair. A photon pair may be emitted along a direction 180°. However, this direction may usually not be 180° and may have a small angular difference between 180°. The angular difference may reflect the non-collimation of photon pair.

A third reason may be penetration and scattering phenomena of photon in a crystal. A photon may be usually detected after it enters a crystal for a distance, and penetration and scattering phenomena of photon may occur within the distance.

The third reason may contribute most among the above-described three reasons which cause the point diffusion phenomenon. Hence, a correction may be performed only for the third reason. An example below may be used to particularly describe the present disclosure in detail.

Figure 2:
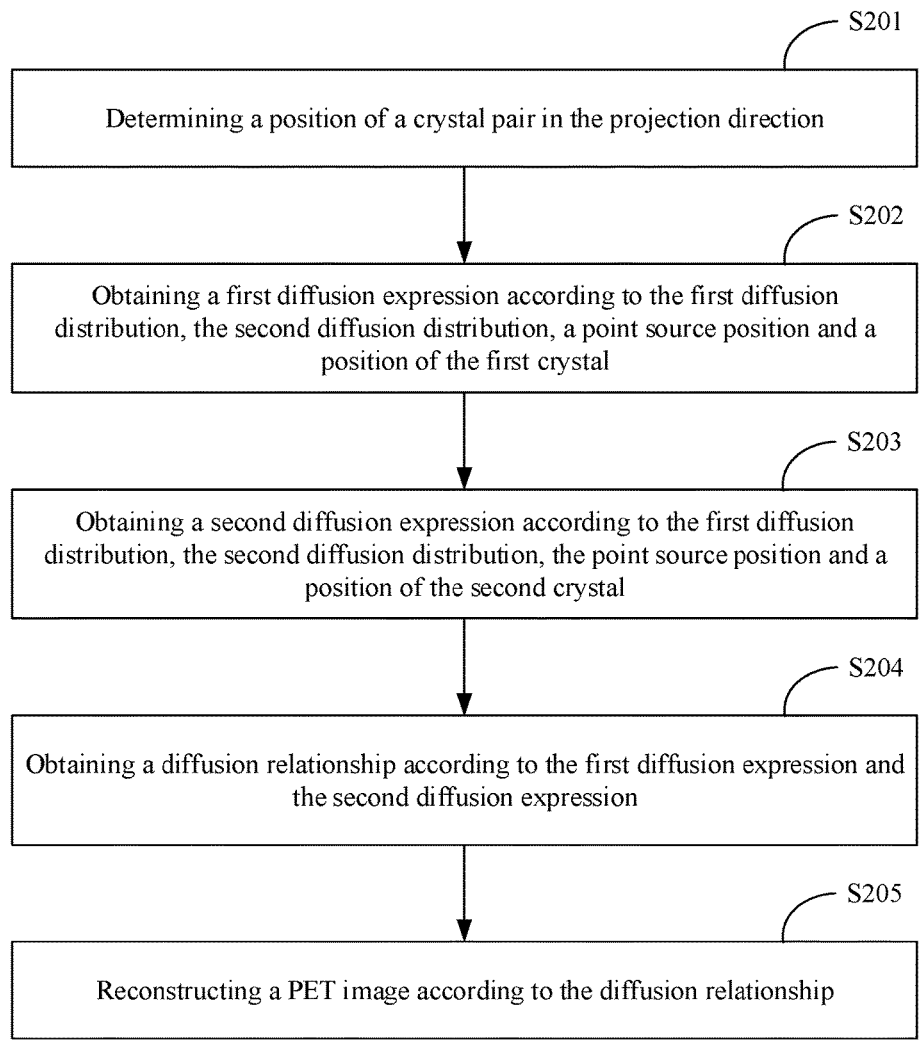
FIG. 2 is a flowchart illustrating an operating procedure of a method of reconstructing a PET image according to an example of the present disclosure.

Referring to FIG. 2, which is a flowchart illustrating an operating procedure of a method of reconstructing a PET image according to an example of the present disclosure.

When a photon moves in a crystal, penetration and scattering phenomena may occur. In an example, a first diffusion distribution and a second diffusion distribution may be obtained, and the penetration and scattering phenomena may be simulated according to the first diffusion distribution and the second diffusion distribution. The first diffusion distribution and the second diffusion distribution will be described below.

Figure 3:
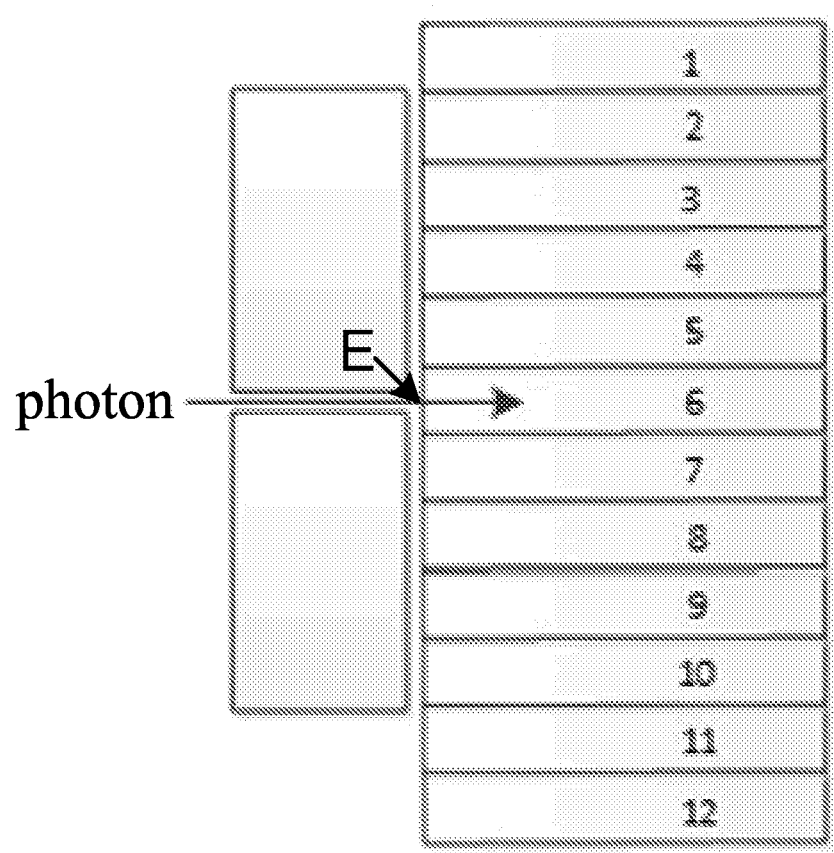
FIG. 3 is a schematic diagram showing that a photon perpendicularly hits onto a front surface of a crystal.

Referring to FIG. 3, which is a schematic diagram showing that a photon perpendicularly hits onto a front surface of a crystal. As shown in FIG. 3, a number of crystals may be placed in a row, and a photon may perpendicularly hit onto a point E of a front surface of one of the crystals. The first diffusion distribution may be obtained according to a set of projection data detected by each crystal in the row of crystals. The first diffusion distribution may indicate a diffusion degree of projection data from the point E to other points along a direction vertical to a first incident direction in which a photon perpendicularly hits onto the front surface of the crystal.

The first diffusion distribution may conform to a Gaussian distribution. In particular, the first diffusion distribution may be a Gaussian model (specifically, a symmetric Gaussian model), and may be expressed as follows:

$$IX(x) = e^{-x^2/\sigma_1^2}.$$

Here, x may represent a distance from a current point to the point E in a direction vertical to the first incident direction; and $\sigma_1$ may be a Gaussian parameter, which may be measured according to projection data detected by each crystal. Two parallel baffles configured to block photons may be placed in front of a crystal for forming a small nip perpendicular to a front surface of the crystal. A point source may be placed on the other side of the small nip so as to ensure that a photon emitted by the point source may substantially perpendicularly hit onto the front surface of the crystal.

Figure 4:
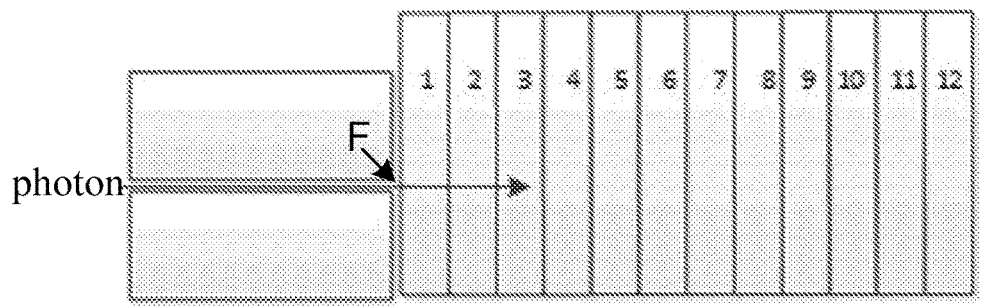
FIG. 4 is a schematic diagram showing that a photon perpendicularly hits onto a side surface of a crystal.

Referring to FIG. 4, which is a schematic diagram showing that a photon perpendicularly hits onto a side surface of a crystal. As shown in FIG. 4, a number of crystals may be placed in a row, and a photon may perpendicularly hit onto a point F of a side surface of one of the crystals. The second diffusion distribution IY(y) may be obtained according to a set of projection data detected by each crystal in the row of crystals. The second diffusion distribution may indicate a diffusion degree of projection data from the point F to other points along a second incident direction in which a photon perpendicularly hits onto the side surface of the crystal.

The second diffusion distribution may conform to a Gamma distribution. In particular, an unknown quantity y of the second diffusion distribution IY(y) may represent a distance from a current point to the point F in the second incident direction. A Gamma parameter may be measured according to projection data detected by each crystal. Two parallel baffles configured to block photons may be placed in the side surface of the crystal for forming a small nip perpendicular to the side surface of the crystal. A point source may be placed on the other side of the small nip so as to ensure that a photon emitted by the point source may substantially perpendicularly hit onto the side surface of the crystal.

After the first diffusion distribution and the second diffusion distribution are obtained, an image reconstruction may be performed. In particular, the method of reconstructing a PET image in an example may include the following steps S201-S205.

At S201, position information of a crystal pair in the projection direction may be determined.

Here, the crystal pair may include a first crystal and a second crystal. For example, the projection direction to be measured currently may be determined first, and then the position information of the crystal pair may be determined according to the projection direction. For example, the position information of the first crystal and the position information of the second crystal located on the projection direction may be determined. The crystal pair may be located in a crystal array, where the crystal array may be usually in a circumferential arrangement.

At block S202, a first diffusion expression may be obtained according to the first diffusion distribution, the second diffusion distribution, a point source position and position information of the first crystal.

Here, the first diffusion expression may represent a diffusion degree of projection data from a first incident point to the first crystal, and the first incident point may be an incident point corresponding to the point source position in the projection direction.

In an example, according to the first diffusion distribution and the second diffusion distribution, the diffusion degrees of projection data from the first incident point to each of other points along an incident direction and along a direction vertical to the incident direction may be obtained, such as, a penetration degree and a scattering degree. Therefore, the first diffusion expression may be obtained according to the first diffusion distribution, the second diffusion distribution, the position information of the first incident point, as well as the position information of and the size of the first crystal. The position information of the first incident point may be determined with the point source position. For example, it may be assumed that an annihilation event may occur immediately after a positron is generated at the point source position and a photon pair with an emission direction of 180° may be generated and hit onto the crystal array. At this time, the position information of the first incident point may be obtained according to the point source position and the projection direction.

Figure 5:
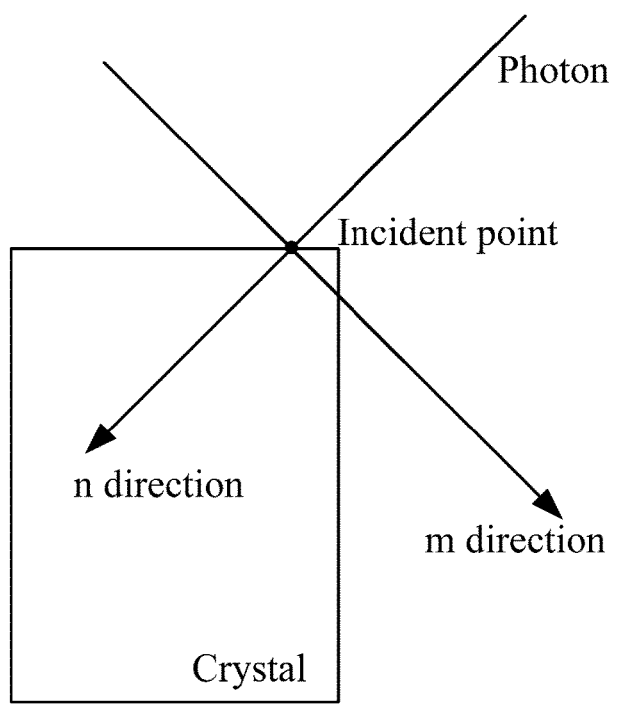
FIG. 5 is a schematic diagram showing that a photon hits onto a crystal in a crystal array.

The first diffusion expression may be obtained by performing an integration on IX(x) and IY(y) For example, as shown in FIG. 5, a positron generated at the point source position may generate a photon pair, and one of the photon pair may hit onto a crystal of the crystal array. The crystal may be the first crystal or may not be the first crystal. It may be assumed that the incident point may be R1, such as, the first incident point, n direction may represent an incident direction of the photon and m direction may represent a direction vertical to the incident direction.

In an example in accordance with the present disclosure, the integration may be performed on a product of the first diffusion distribution and the second diffusion distribution so as to obtain the first diffusion expression $P_1$, where the integration range may be a region of the first crystal. In particular, the first diffusion expression $P_1$ may be expressed as below:

$$P_1 = \iint_{\Omega_1 \Omega_2} IX(x) IY(y)$$

Here, the region of the first crystal may include a first region $\Omega_1$ and a second region $\Omega_2$. The first region $\Omega_1$ may be a projection area of the first crystal in the m direction and the first incident point R1 is an origin of this projection area. The second region $\Omega_2$ may be a projection area of the first crystal in the n direction and the first incident point R1 is an origin of this projection area.

At block S203, a second diffusion expression may be obtained according to the first diffusion distribution, the second diffusion distribution, the point source position and position information of the second crystal.

Here, the second diffusion expression may represent a diffusion degree of projection data from a second incident point to the second crystal, where the second incident point may be another incident point corresponding to the point source position in the projection direction.

In an example, according to the first diffusion distribution and the second diffusion distribution, the diffusion degrees of projection data from the second incident point to each of other points along an incident direction and along a direction vertical to the incident direction may be obtained, such as, a penetration degree and a scattering degree. Therefore, the second diffusion expression may be obtained according to the first diffusion distribution, the second diffusion distribution, the position information of the second incident point, as well as the position and the size of the second crystal. The position information of the second incident point may be determined with the point source position. For example, it may be assumed that an annihilation event may occur immediately after a positron is generated at the point source position and a photon pair with an emission direction of 180° may be generated and hit onto the crystal array. In this case, the position information of the second incident point may be obtained according to the point source position and the projection direction.

The second diffusion expression may be obtained by performing an integration on IX(x) and IY(y). For example, as shown in FIG. 5, a positron generated at the point source position may generate a photon pair, and another photon of the photon pair may hit onto a crystal of the crystal array. The crystal may be the second crystal or may not be the second crystal. It may be assumed that the incident point may be R2, such as, the second incident point, n direction may represent an incident direction of a photon and m direction may represent a direction vertical to the incident direction.

In an example in accordance with the present disclosure, the integration may be performed on a product of the first diffusion distribution and the second diffusion distribution so as to obtain the second diffusion expression $P_2$ where the integration range may be a region of the second crystal. In particular, the second diffusion expression $P_2$ may be expressed as below:

$$P_2 = \iint_{\Omega_3 \Omega_4} IX(x) IY(y).$$

Here, the region of the second crystal may include a third region $\Omega_3$ and a fourth region $\Omega_4$. The third region $\Omega_3$ may be a projection area of the second crystal in the m direction and the second incident point R2 is an origin of this projection area. The fourth region $\Omega_4$ may be a projection area of the second crystal in the n direction and the second incident point R2 is an origin of this projection area.

At block S204, a diffusion relationship may be obtained according to the first diffusion expression and the second diffusion expression.

The first diffusion expression may represent the diffusion degree of projection data from the first incident point R1 to the first crystal and the second diffusion expression may represent the diffusion degree of projection data from the second incident point R2 to the second crystal. The first diffusion expression may concern a correspondence relationship between the point source position and the position information of the first incident point, and the second diffusion expression may concern a correspondence relationship between the point source position and the position information of the second incident point. Hence, a diffusion relationship may be obtained according to the first diffusion expression and the second diffusion expression. The diffusion relationship may concern the correspondence relationship between the point source position and projection data in the projection direction. The diffusion relationship may be generally in a form of a matrix, and may also be referred to as a diffusion matrix.

In particular, a product of the first diffusion expression and the second diffusion expression may be repressed as the diffusion relationship, such as:

$$P_1 \times P_2 = \iint_{\Omega_1 \Omega_2} IX(x) IY(y) \times \iint_{\Omega_3 \Omega_4} IX(x) IY(y).$$

At block S205, a PET image may be reconstructed according to the diffusion relationship.

The diffusion matrix in the projection direction may be obtained according to the diffusion relationship. A complete diffusion matrix M may be obtained according to the diffusion matrix in a projection direction or a plurality of projection directions by using symmetry of the PET system, and then a PET image may be reconstructed according to the diffusion matrix M.

As can be known from the above-described technical solution, in an example in accordance with the present disclosure, the first diffusion distribution may conform to a Gaussian distribution model and the second diffusion distribution may conform to a Gamma distribution model, which may represent the diffusion degrees of projection data along an incident direction of photon and along a direction vertical to the incident direction, such as, a penetration degree and a scattering degree. Therefore, the first diffusion expression and the second diffusion expression may be obtained according to the first diffusion distribution, the second diffusion distribution, the point source position, the position information of the first crystal, and the position information of the second crystal. The first diffusion expression may indicate the diffusion degree of projection data from the first incident point to the first crystal. The second diffusion expression may indicate the diffusion degree of projection data from the second incident point to the second crystal. Since the first diffusion expression may include the correspondence relationship between the point source position and the position information of the first incident point, and the second diffusion expression may include the correspondence relationship between the point source position and the position information of the second incident point, the correspondence relationship between the point source position and projection data on the first crystal and on the second crystal may be obtained according to the first diffusion expression and the second diffusion expression, and the PET image may be reconstructed according to the correspondence relationship.

As can be seen from an example of the present disclosure, when reconstructing an image, a correction may be performed on a point diffusion phenomenon caused by penetration and scattering of photon in a crystal. The first diffusion distribution and the second diffusion distribution may be obtained based on two measurements only. Therefore, workload may be reduced without measuring a large number of point source positions and corresponding diffusion parameters.

In an example in accordance with the present disclosure, the position information of the first incident point and the position information of the second incident point may be determined based on an ideal case that an annihilation event occurs immediately after a positron is generated. In practice, due to an annihilation range of a positron and/or the non-collimation of photon pair, the above-described positions of incident points determined based on the ideal case may not conform to the actual situation, which may lead to a point diffusion phenomenon.

In the following, a correction performed on a point diffusion phenomenon caused by an annihilation range of a positron is explained first.

Figure 6:
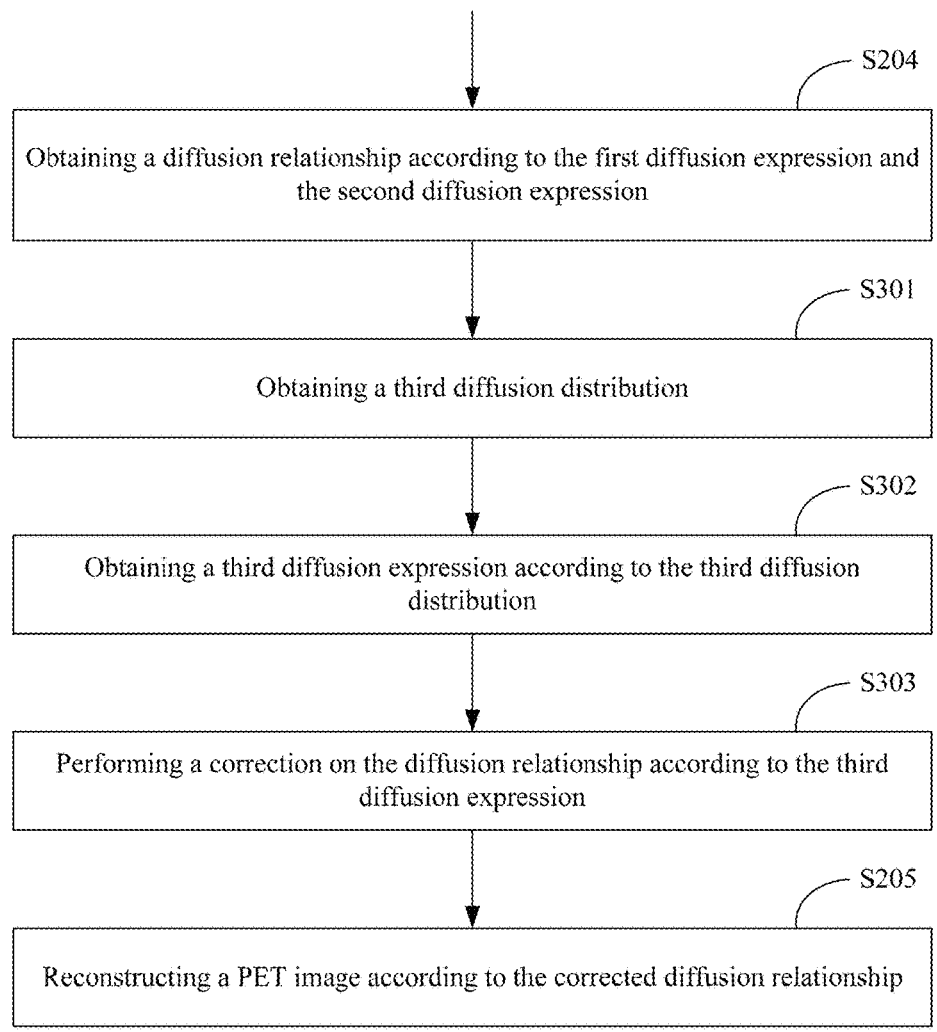
FIG. 6 is a flowchart illustrating an operating procedure of a method of reconstructing a PET image according to another example of the present disclosure.

Referring to FIG. 6, which is a flowchart illustrating an operating procedure of a method of reconstructing a PET image according to another example of the present disclosure. On the basis of the blocks shown in FIG. 2, the method shown in FIG. 6 may further include the blocks S301, S302, and S303.

At block S301, a third diffusion distribution may be obtained.

Here, the third diffusion distribution may represent a diffusion degree of the point source along a direction vertical to the projection direction. The third diffusion distribution may conform to a Gaussian distribution, which may be expressed as follows:

$$R(w) = e^{-w^2/(2\sigma_2^2)}.$$

Here, w may represent a distance from a point to the point source in a direction vertical to the projection direction, and $\sigma_2$ may be a Gaussian parameter, which may be determined according to a full width at half maximum FWHW1 of the third diffusion distribution R(w). For example:

$$\sigma_2 = \frac{FWHW1}{2\sqrt{2\ln 2}}.$$

At block S302, a third diffusion expression may be obtained according to the third diffusion distribution.

Here, the third diffusion expression may represent a diffusion degree of the point source in a fifth region $\Omega 5$. The fifth region $\Omega 5$ may represent a diffusion region of the point source in a direction vertical to the projection direction. For example, the third diffusion expression may be expressed as follows:

$$\int_{\Omega 2} R(w)$$

Here, the fifth region $\Omega 5$ may be determined according to the full width at half maximum (FWHW1) of the third diffusion distribution R(w). For example, the fifth region $\Omega 5$ may be a multiple of the full width at half maximum FWHW1, such as, two times or three times.

At block S303, a correction may be performed on the diffusion relationship according to the third diffusion expression. Then, the procedure may proceed to the block S205 so as to reconstruct a PET image based on the corrected diffusion relationship.

For example, the corrected diffusion relationship may be expressed as follows:

$$\int_{\Omega 5} R(w) \times \iint_{\Omega 1 \Omega 2} IX(s)IY(s) \times \iint_{\Omega 3 \Omega 4} IX(s)IY(s).$$

A correction performed on the point diffusion phenomenon caused by non-collimation of photon pair may be explained below.

Figure 7:
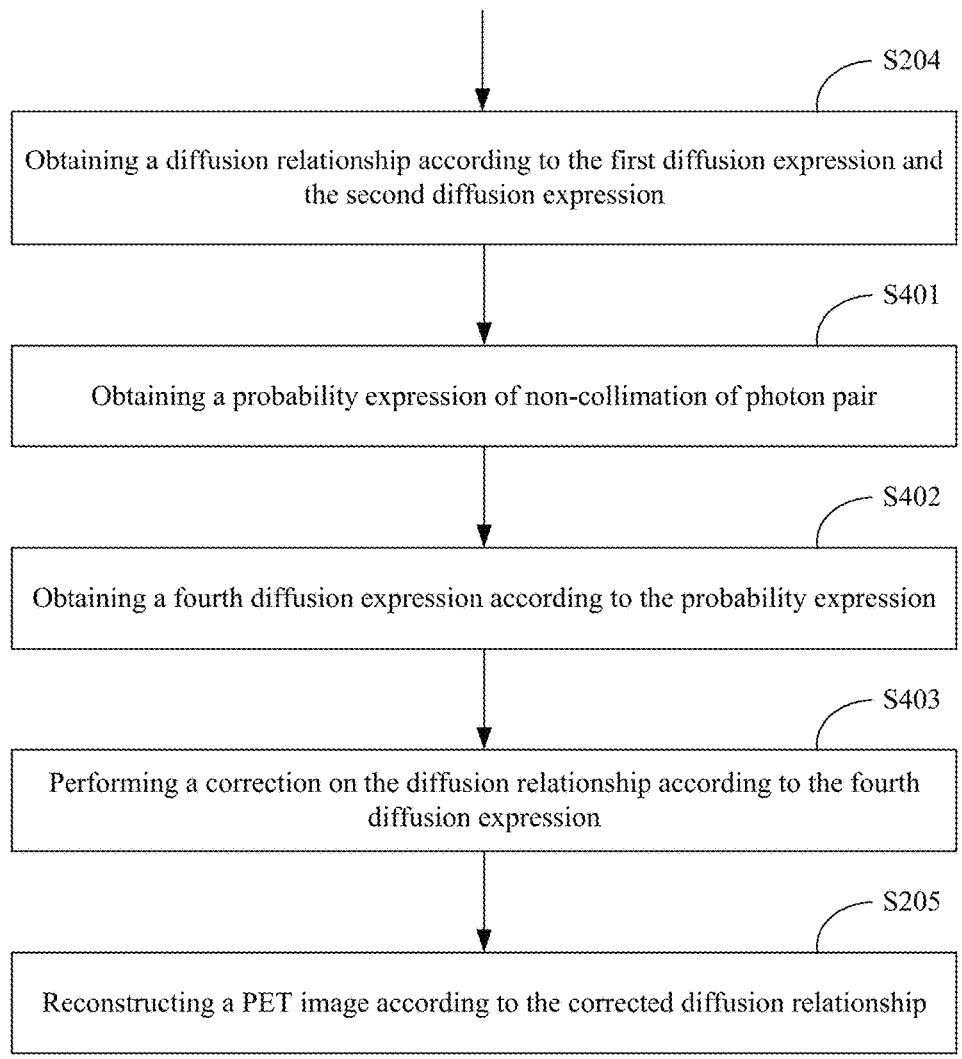
FIG. 7 is a flowchart illustrating an operating procedure of a method of reconstructing a PET image according to still another example of the present disclosure.

Referring to FIG. 7, which is a flowchart illustrating an operating procedure of a method of reconstructing a PET image according to still another example of the present disclosure. On the basis of the blocks shown in FIG. 2, the method shown in FIG. 7 may further include the blocks S401, S402, and S403.

At block S401, a probability expression of non-collimation of photon pair may be obtained.

Here, the probability expression may represent a deflection probability of an emergent direction of a photon pair with respect to an emergent direction of 180°. The probability expression may conform to a Gaussian distribution, which may be expressed as follows:

$$NL(\theta) = e^{-\theta^2/(2\sigma_3^2)}.$$

Here, $\theta$ may represent a non-collimation angle, which may be an angle between the emergent direction of the photon pair and 180°. $\sigma_3$ may be a Gaussian parameter, which may be determined according to a full width at half maximum FWHW2 of the probability expression NL($\theta$), for example:

$$\sigma_3 = \frac{FWHW2}{2\sqrt{2\ln 2}}.$$

At block S402, a fourth diffusion expression may be obtained according to the probability expression.

Here the fourth diffusion expression may represent a probability that non-collimation affects an incident point of photon. The fourth diffusion expression may be obtained by performing an integration on the probability expression NL(θ). For example, the fourth diffusion expression may be expressed as below:

$$\int_{\Omega 6} NL(\theta).$$

Here, an integration range Ω6 may be determined according to the full width at half maximum FWHW2 of the probability expression NL(θ). For example, the integration range Ω6 may be a multiple of the full width at half maximum FWHW2, such as, two times or three times.

At block S403, a correction may be performed on the diffusion relationship according to the fourth diffusion expression. Then the procedure may proceed to the block S205 so as to reconstruct a PET image based on the corrected diffusion relationship.

For example, the corrected diffusion relationship may be expressed as follows:

$$\int_{\Omega 6} NL(\theta) \times \iint_{\Omega 1\Omega 2} IX(s)IY(s) \times \iint_{\Omega 3\Omega 4} IX(s)IY(s).$$

In an example in accordance with the present disclosure, the point diffusion degree caused by an annihilation range of a positron and non-collimation of photon pair may be smaller, and may be ignored or simulated by using a Gaussian model. If a Gaussian model is used for simulation, the diffusion relationship may be expressed as follows:

$$g^*(P_1 \times P_2).$$

Here, g may be a Gaussian function, "*" may represent a convolution operation. Compared with a multiplication operation, a convolution operation may be much easier. The Gaussian function g may be specifically obtained by multiplying the third diffusion expression $\int_{\Omega 5} R(w)$ and the fourth diffusion expression $\int_{\Omega 6} NL(\theta)$.

Be noted that, in an example of the present disclosure, the diffusion relationship may be corrected based on the third diffusion expression and the fourth diffusion expression, and then a PET image may be reconstructed by using the corrected diffusion relationship. The corrected diffusion relationship may be expressed as follows:

$$\int_{\Omega 5} R(w) \times \int_{\Omega 6} NL(\theta) \times \iint_{\Omega 1\Omega 2} IX(s)IY(s) \times \iint_{\Omega 3\Omega 4} IX(s)IY(s).$$

In an example in accordance with the present disclosure, since the first crystal and the second crystal have a certain size, the projection direction may be a strip, rather than a line. When considering the influence of this factor, a plurality of photon pairs with different emission directions may be obtained. Thus, before reconstructing a PET image, a correction may be performed on the diffusion relationship according to a fifth diffusion expression. The fifth diffusion expression may be obtained by performing an integration on φ/π, where φ may represent an emission angle of a photon with respect to the projection direction. For example, the fifth diffusion expression may be expressed as below:

$$\int_{\Omega 7} \varphi/\pi.$$

Here, a seventh region Ω7 may be determined according to a crystal range. The crystal range may refer to a side length of the first crystal or the second crystal facing a center of the crystal array. For example, the seventh region Ω7 may be twice or triple the crystal range.

In an example of the present disclosure, any one of the above-described diffusion relationships may be multiplied by the fifth diffusion expression to be acted as the corrected diffusion relationship. For example, the diffusion relationship may be expressed as below:

$$\int_{\Omega 7} \varphi/\pi \times \int_{\Omega 5} R(w) \times \int_{\Omega 6} NL(\theta) \times \iint_{\Omega 1\Omega 2} IX(s)IY(s) \times \iint_{\Omega 3\Omega 4} IX(s)IY(s).$$

The examples of the present disclosure may establish models separately for different reasons leading to the point diffusion phenomenon. In particular, a Gaussian model may be established for an annihilation range of a positron and non-collimation of photon pair. For penetration and scattering of photon in a crystal, a Gaussian model may be established in a direction vertical to an emission direction of a photon, and a Gamma model may be established in an emission direction of the photon. Then, the correspondence relationship between the point source position and projection data in the projection direction, e.g., the diffusion relationship, may be determined according to these models, and a PET image may be reconstructed according to the diffusion relationship.

Since these models are established separately for different reasons leading to the point diffusion phenomenon, the correction accuracy of this reconstruction method may be further improved.

Figure 8:
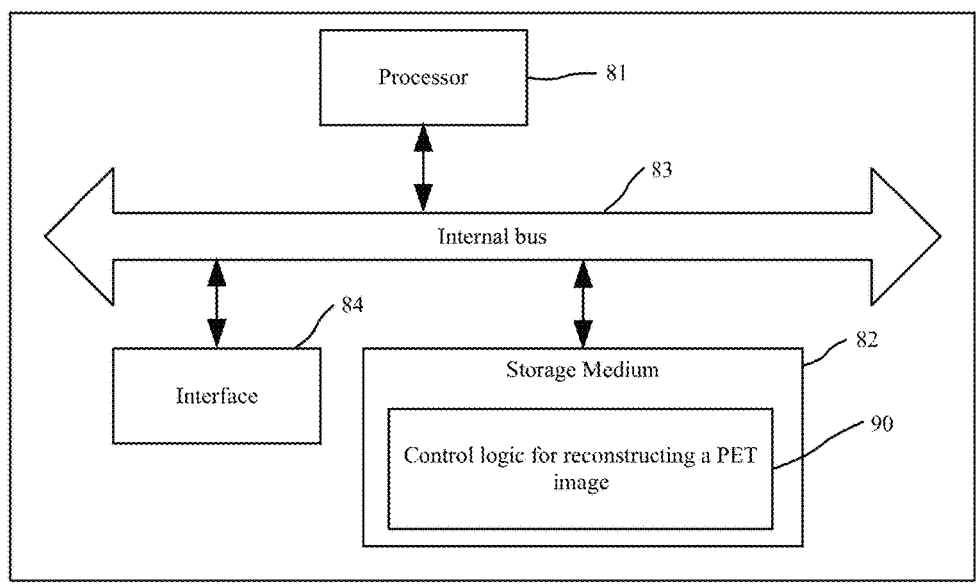
FIG. 8 is a hardware architecture diagram of a device for reconstructing a PET image according to an example of the present disclosure.

Referring to FIG. 8, which is a hardware architecture diagram of a device for reconstructing a PET image according to an example of the present disclosure. As shown in FIG. 8, the PET image reconstruction device may include a processor 81 and a machine readable storage medium 82, where the processor 81 may be connected to the machine readable storage medium 82 through an internal bus 83. In other possible implementations, the device for reconstructing a PET image may further include an interface 84 for communicating with other devices or components.

In different examples, the machine readable storage medium 82 may be Read-Only Memory (ROM), Random Access Memory (RAM), volatile memory, non-volatile memory, flash memory, storage drives (such as, a hard drive), solid state drive, any type of storage disks (such as, CD-ROM, DVD, etc.), or similar storage medium, or a combination thereof.

Figure 9:
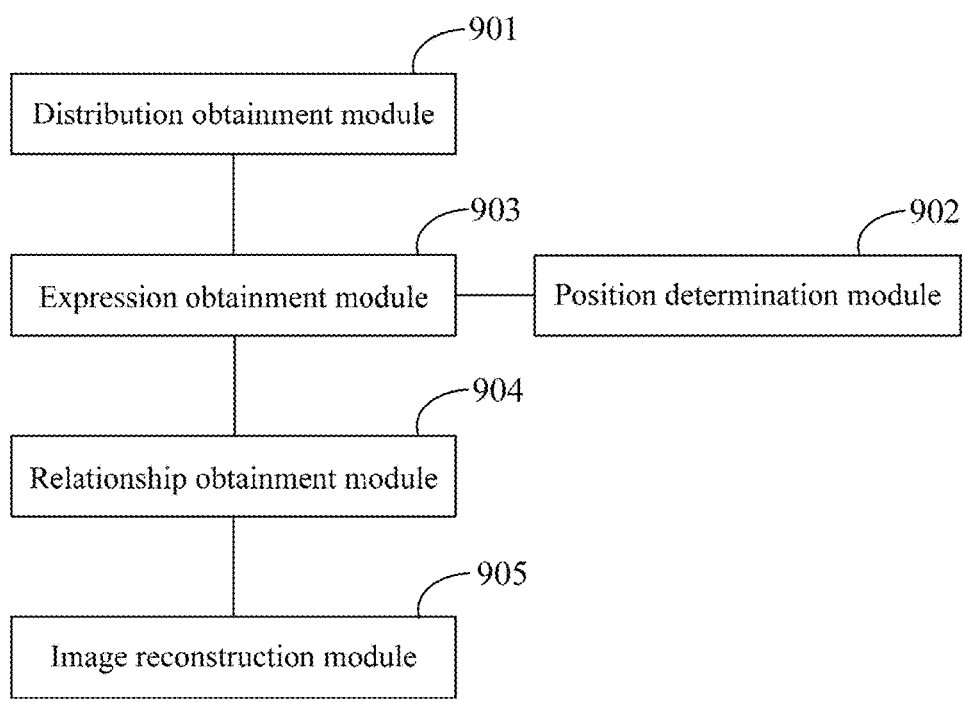
FIG. 9 is a block diagram of a control logic for reconstructing a PET image according to an example of the present disclosure.

In an example, the machine readable storage medium 82 may be used to store machine readable instructions corresponding to a control logic 90 for reconstructing PET image. Referring to FIG. 9, which is a block diagram of a control logic for reconstructing PET image according to an example of the present disclosure. As shown in FIG. 9, the control logic 90 may include a distribution obtainment module 901, a position determination module 902, an expression obtainment module 903, and a relationship obtainment module 904, and an image reconstruction module 905.

The distribution obtainment module 901 may be used to obtain a first diffusion distribution and a second diffusion distribution. In an example, penetration and scattering phenomena may be respectively simulated according to the first diffusion distribution and the second diffusion distribution. The first diffusion distribution and the second diffusion distribution may be explained as below.

As shown in FIG. 3, a number of crystals may be placed in a row, and a photon may perpendicularly hit onto a point E of a front surface of one of the crystals. The first diffusion distribution may be obtained according to a set of projection data detected by each crystal in the row of crystals, where the first diffusion distribution may indicate a diffusion degree of projection data from the point E to other points along a direction vertical to an incident direction in which a photon perpendicularly hits onto the front surface of the crystal. The first diffusion distribution may conform to a Gaussian distribution. In particular, the first diffusion distribution may be a Gaussian model (specifically, a symmetric Gaussian model), and may be expressed as follows:

$$IX(x)=e^{-x^2/(2\sigma_1^2)}.$$

Here, x may represent a distance from a current point to the point E in a direction vertical to the first incident direction; and $\sigma_1$ may be a Gaussian parameter, which may be measured according to projection data detected by each crystal. Additionally, as shown in FIG. 3, two parallel baffles configured to block photons may be placed in front of a crystal for forming a small nip perpendicular to a front surface of the crystal, and a point source may be placed on the other side of the small nip to ensure that a photon emitted by the point source may substantially perpendicularly hit onto the front surface of the crystal.

As shown in FIG. 4, a number of crystals may be placed in a row, and a photon may perpendicularly hit onto a point F of a side surface of one of the crystals. The second diffusion distribution IY(y) may be obtained according to a set of projection data detected by each crystal in the row of crystals, where the second diffusion distribution may indicate a diffusion degree of projection data from the point F to other points along a second incident direction in which a photon perpendicularly hits onto the side surface of the crystal. The second diffusion distribution may conform to a Gamma distribution. In particular, an unknown quantity y of the second diffusion distribution IY(y) may represent a distance from a current point to the point F in the second incident direction, and a Gamma parameter may be measured according to projection data detected by each crystal. Additionally, as shown in FIG. 4, two parallel baffles configured to block photons may be placed in the side surface of the crystal for forming a small nip perpendicular to the side surface of the crystal, and a point source may be placed on the other side of the small nip to ensure that a photon emitted by the point source may substantially perpendicularly hit onto the side surface of the crystal.

The position determination module 902 may be used to determine the position information of the crystal pair in the projection direction, where the crystal pair may include a first crystal and a second crystal. For example, the projection direction may be determined by the position determination module 902 first, and then the position information of the crystal pair may be determined by the position determination module 902 according to the projection direction, such as, the position information of the first crystal and the position information of the second crystal located on the projection direction. The crystal pair may be located in the crystal array, where the crystal array may be usually in a circumferential arrangement.

The expression obtainment module 903 may be used to obtain a first diffusion expression according to the first diffusion distribution, the second diffusion distribution, a point source position and position information of the first crystal. Here, the first diffusion expression may represent a diffusion degree of projection data from a first incident point to the first crystal, and the first incident point may be an incident point corresponding to the point source position in the projection direction. The position information of the first incident point may be determined with the point source position. For example, in an ideal case, the position information of the first incident point may be obtained according to the point source position and the projection direction.

The first diffusion distribution may be obtained by performing an integration on IX(x) and IY(y). In particular, the expression obtainment module 903 may use the following formula to perform the integration on a product of the first diffusion distribution and the second diffusion distribution so as to obtain the first diffusion expression $P_1$, where an integration range may be a region of the first crystal. The first diffusion expression $P_1$ may be expressed as follows:

$$P_1=\iint_{\Omega_1\Omega_2}IX(x)IY(y).$$

Here, the region of the first crystal may include a first region $\Omega 1$ and a second region $\Omega 2$. The first region $\Omega 1$ may be a projection area of the first crystal in a direction vertical to an incident direction of a photon and the first incident point R1 is an origin of this projection area. The second region $\Omega 2$ may be a projection area of the first crystal in an incident direction of a photon and the first incident point R1 is an origin of this projection area.

The expression obtainment module 903 may be further used to obtain a second diffusion expression according to the first diffusion distribution, the second diffusion distribution, the point source position and position information of the second crystal. Here, the second diffusion expression may represent a diffusion degree of projection data from a second incident point to the second crystal. The second incident point may be another incident point corresponding to the point source position in the projection direction. The position information of the second incident point may be represented by the point source position. For example, in an ideal case, the position information of the second incident point may be obtained according to the point source position and the projection direction.

The second diffusion distribution may be obtained by performing an integration on IX(x) and IY(y). In particular, the expression obtainment module 903 may use the following formula to perform the integration on a product of the first diffusion distribution and the second diffusion distribution so as to obtain the second diffusion expression $P_2$, where an integration range may be a region of the second crystal. The second diffusion expression $P_2$ may be expressed as follows:

$$P_2=\iint_{\Omega_3\Omega_4}IX(x)IY(y).$$

Here, the region of the second crystal may include a third region $\Omega 3$ and a fourth region $\Omega 4$. The third region $\Omega 3$ may be a projection area of the second crystal in a direction vertical to an incident direction of a photon and the second incident point R2 is an origin of this projection area. The fourth region $\Omega 4$ may be a projection area of the second crystal in an incident direction of a photon and the second incident point R2 is an origin of this projection area.

The relationship obtainment module 904 may be used to obtain the diffusion relationship according to the first diffusion expression and the second diffusion expression. The diffusion relationship may concern a correspondence relationship between the point source position and projection data in the projection direction. The diffusion relationship may be generally in a form of a matrix, and may also be referred to as a diffusion matrix.

In particular, a product of the first diffusion expression and the second diffusion expression may be expressed as the diffusion relationship, such as.

$$P_1 \times P_2=\iint_{\Omega_1\Omega_2}IX(x)IY(y)\times\iint_{\Omega_3\Omega_4}IX(x)IY(y).$$

The image reconstruction module 905 may be used to reconstruct a PET image according to the diffusion relationship.

The diffusion matrix in the projection direction may be obtained by the image reconstruction module 905 according to the diffusion relationship. A complete diffusion matrix M may be obtained according to the diffusion matrix in a projection direction or a plurality of projection directions by using symmetry of the PET system, and then a PET image may be reconstructed according to the diffusion matrix M.

In an example of the present disclosure, the position information of the first incident point and the position information of the second incident point may be determined based on an ideal case. In practice, due to an annihilation range of a positron and/or non-collimation of photon pair, the above-described positions determined based on the ideal case may not conform to the actual situation, which may lead to a point diffusion phenomenon.

A correction performed on the point diffusion phenomenon caused by an annihilation range of a positron may be explained first.

The distribution obtainment module 901 may be further used to obtain a third diffusion distribution. Here, the third diffusion distribution may represent a diffusion degree of the point source along a direction vertical to the projection direction. The third diffusion distribution may conform to a Gaussian distribution, which may be expressed as follows:

$$R(w) = e^{-w^2/(2\sigma_2^2)}.$$

Here, w may represent a distance from a point to the point source in a direction vertical to the projection direction, and $\sigma_2$ may be a Gaussian parameter, which may be determined according to a full width at half maximum FWHW1 of the third diffusion distribution R(w). For example:

$$\sigma_2 = \frac{FWHW1}{2\sqrt{2\ln 2}}.$$

The expression obtainment module 903 may be further used to obtain a third diffusion expression according to the third diffusion distribution. Here, the third diffusion expression may represent a diffusion degree of the point source in a fifth region Ω5. The fifth region Ω5 may represent a diffusion region of the point source in a direction vertical to the projection direction. For example, the third diffusion expression may be expressed as follows:

$$\int_{\Omega 5} R(w).$$

Here, the fifth region Ω5 may be determined according to the full width at half maximum FWHW1 of the third diffusion distribution R(w). For example, the fifth region Ω5 may be a multiple of the full width at half maximum FWHW1, such as, two times or three times.

In this case, before the PET image is reconstructed by the image reconstruction module 905, a correction may be performed on the diffusion relationship according to the third diffusion expression. Then, the PET image may be reconstructed by using the corrected diffusion relationship. For example, the corrected diffusion relationship may be specifically expressed as follows:

$$\int_{\Omega 5} R(w) \times \iint_{\Omega 1 \Omega 2} IX(s) IY(s) \times \iint_{\Omega 3 \Omega 4} IX(s) IY(s).$$

A correction performed on the point diffusion phenomenon caused by non-collimation of photon pair may be explained below.

The expression obtainment module 903 may be further used to obtain a probability expression of non-collimation of photon pair. Here, the probability expression may represent a deflection probability of an emergent direction of a photon pair with respect to an emergent direction of 180°. The probability expression may conform to a Gaussian distribution, which may be expressed as follows:

$$NL(\theta) = e^{-\theta^1/(2\sigma_3^2)}.$$

Here, θ may represent a non-collimation angle, which may be an angle between the emergent direction of a photon pair and 180°. $\theta_3$ may be a Gaussian parameter, which may be determined according to a full width at half maximum FWHW2 of the probability expression NL(θ), for example:

$$\sigma_3 = \frac{FWHW2}{2\sqrt{2\ln 2}}.$$

The expression obtainment module 903 may be further used to obtain a fourth diffusion expression according to the probability expression. Here the fourth diffusion expression may represent a probability that non-collimation affects an incident point of photon.

The fourth diffusion expression may be obtained by performing an integration on the probability expression NL(θ). For example, the fourth diffusion expression may be expressed as follows:

$$\int_{\Omega 6} NL(\theta).$$

Here, an integration range Ω6 may be determined according to the full width at half maximum FWHW2 of the probability expression NL(θ) For example, the integration range Ω6 may be a multiple of the full width at half maximum FWHW2, such as, two times or three times.

In this case, before the PET image is reconstructed by the image reconstruction module 905, a correction may be performed on the diffusion relationship according to the fourth diffusion expression. Then, the PET image may be reconstructed by using the corrected diffusion relationship. For example, the corrected diffusion relationship may be expressed as follows:

$$\int_{\Omega 6} NL(\theta) \times \iint_{\Omega 1 \Omega 2} IX(s) IY(s) \times \iint_{\Omega 3 \Omega 4} IX(s) IY(s).$$

In an example of the present disclosure, the point diffusion degree caused by an annihilation range of a positron and non-collimation of photon pair may be smaller, and may be ignored or simulated by using a Gaussian model. If a Gaussian model is used for simulation, the diffusion relationship may be expressed as follows:

$$g * (P_1 \times P_2).$$

Here, g may be a Gaussian function, "*" may represent a convolution operation. The Gaussian function g may be specifically obtained by multiplying the third diffusion expression $\int_{\Omega 5} R(w)$ and the fourth diffusion expression $\int_{\Omega 6} NL(\theta)$.

Be noted that, the diffusion relationship may be corrected based on the third diffusion expression and the fourth diffusion expression. For example, the image reconstruction module 905 may reconstruct a PET image by using the corrected diffusion relationship based on the third diffusion expression and the fourth diffusion expression. The corrected diffusion relationship may be expressed as follows:

$$\int_{\Omega 5} R(w) \times \int_{\Omega 6} NL(\theta) \times \iint_{\Omega 1 \Omega 2} IX(s) IY(s) \times \iint_{\Omega 3 \Omega 4} IX(s) IY(s).$$

In an example of the present disclosure, since the first crystal and the second crystal have a certain size, the projection direction may be a strip, rather than a line. When considering the influence of this factor, the expression obtainment module 903 may be further used to obtain a fifth diffusion expression. Before a PET image is reconstructed by the image reconstruction module 905, a correction may be performed on the diffusion relationship according to the fifth diffusion expression. The fifth diffusion expression may be obtained by performing an integration on $\varphi/\pi$, where $\varphi$ may represent an emission angle of a photon with respect to the projection direction. For example, the fifth diffusion expression may be expressed as follows:

$$\int_{\Omega 7} \varphi/\pi.$$

Here, a seventh region $\Omega 7$ may be determined according to a crystal range. The crystal range may refer to a side of the first crystal or the second crystal facing a center of the crystal array. For example, the seventh region $\Omega 7$ may be twice or triple the crystal range.

In an example of the present disclosure, any one of the above-described diffusion relationships may be multiplied by the fifth diffusion expression to be acted as the corrected diffusion relationship. For example, the diffusion relationship may be expressed as follows:

$$\int_{\Omega 7} \varphi/\pi \times \int_{\Omega 5} R(w) \times \int_{\Omega 6} NL(\theta) \times \iint_{\Omega 1 \Omega 2} IX(s)IY(s) \times \iint_{\Omega 3 \Omega 4} IX(s)IY(s).$$

The examples below may be implemented with software, which may describe how the device for reconstructing a PET image runs the control logic 90. In an example, the control logic 90 of the present disclosure may be understood as machine readable instructions stored in the machine readable storage medium 82. When the processor 81 of the device for reconstructing a PET image executes the control logic 90, the processor 81 may execute corresponding machine readable instructions of the control logic 90 stored in the machine readable storage medium 82 to:

obtain a first diffusion distribution and a second diffusion distribution, where the first diffusion distribution may represent a diffusion degree of projection data along a direction vertical to an incident direction indicating a photon perpendicularly hitting onto a front surface of a crystal, and the second diffusion distribution may represent a diffusion degree of projection data along an incident direction indicating a photon perpendicularly hitting onto a side surface of a crystal;

determine position information of a first crystal and a second crystal in a projection direction;

obtain a first diffusion expression according to the first diffusion distribution, the second diffusion distribution, a point source position and the position information of the first crystal, where the first diffusion expression may represent a diffusion degree of projection data from a first incident point to the first crystal;

obtain a second diffusion expression according to the first diffusion distribution, the second diffusion distribution, the point source position and the position information of the second crystal, where the second diffusion expression may represent a diffusion degree of projection data from a second incident point to the second crystal, and the first incident point and the second incident point may be respectively two incident points corresponding to the point source position in the projection direction;

obtain a diffusion relationship according to the first diffusion expression and the second diffusion expression, where the diffusion relationship may represent a correspondence relationship between the point source position and projection data in the projection direction; and reconstruct a PET image according to the diffusion relationship.

Here, the first diffusion distribution may conform to a Gaussian distribution, and the second diffusion distribution may conform to a Gamma distribution.

According to an example, when obtaining the first diffusion expression, said machine readable instructions may further cause the processor 81 to perform an integration on a region of the first crystal for a product of the first diffusion distribution and the second diffusion distribution. The region of the first crystal may include a first region and a second region. The first region may be a projection area of the first crystal in a direction vertical to an incident direction of a photon and the first incident point is an origin of this projection area. The second region may be a projection area of the first crystal in an incident direction of a photon and the first incident point is an origin of this projection area.

According to another example, when obtaining the second diffusion expression, said machine readable instructions may further cause the processor 81 to perform an integration on a region of the second crystal for a product of the first diffusion distribution and the second diffusion distribution, so as to obtain the second diffusion expression. The region of the second crystal may include a third region and a fourth region. The third region may be a projection area of the second crystal in a direction vertical to an incident direction of a photon and the second incident point is an origin of this projection area. The fourth region may be a projection area of the second crystal in an incident direction of a photon and second first incident point is an origin of this projection area.

According to an example, said machine readable instructions may further cause the processor 81 to: obtain a third diffusion distribution, which may represent a diffusion degree of a point source along a direction vertical to the projection direction and conform to a Gaussian distribution; obtain a third diffusion expression according to the third diffusion distribution, where the third diffusion expression may represent a diffusion degree of the point source in a fifth region, and the fifth region may represent a diffusion region of the point source in a direction vertical to the projection direction; and perform a correction on the diffusion relationship according to the third diffusion expression before a PET image is reconstructed.

According to an example, said machine readable instructions may further cause the processor 81 to: obtain a probability expression of non-collimation of photon pair, where the probability expression may conform to a Gaussian distribution; obtain a fourth diffusion expression according to the probability expression, where the fourth diffusion expression may represent a probability that the non-collimation affects an incident point of photon; and perform a correction on the diffusion relationship according to the fourth diffusion expression before a PET image is reconstructed.

According to an example, said machine readable instructions may further cause the processor 81 to: obtain a fifth diffusion expression by performing an integration on $\varphi/\pi$, where $\varphi$ may be an emission angle of a photon with respect to the projection direction; and perform a correction on the diffusion relationship according to the fifth diffusion expression before the PET image is reconstructed.

The above are only preferred examples of the present disclosure is not intended to limit the disclosure within the spirit and principles of the present disclosure, any changes made, equivalent replacement, or improvement in the protection of the present disclosure should contain within the range.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from a broad general scope of the present disclosure. The present embodiments are, therefore, to be considered in all respects as illustrative and not restrictive.

The invention claimed is:

1. A method of reconstructing a PET image, comprising:
   obtaining a first diffusion distribution and a second diffusion distribution, wherein the first diffusion distribution represents a diffusion degree of projection data along a direction vertical to an incident direction indicating a photon perpendicularly hitting onto a front surface of a crystal, and the second diffusion distribution represents a diffusion degree of projection data along an incident direction indicating a photon perpendicularly hitting onto a side surface of a crystal;
   determining position information of a first crystal and a second crystal in a projection direction;
   obtaining a first diffusion expression according to the first diffusion distribution, the second diffusion distribution, a point source position where a photon is generated and the position information of the first crystal, wherein the first diffusion expression represents a diffusion degree of projection data from a first incident point to the first crystal;
   obtaining a second diffusion expression according to the first diffusion distribution, the second diffusion distribution, the point source position and the position information of the second crystal, wherein the second diffusion expression represents a diffusion degree of projection data from a second incident point to the second crystal, and the first incident point and the second incident point are respectively two incident points corresponding to the point source position in the projection direction;
   obtaining a diffusion relationship according to the first diffusion expression and the second diffusion expression, wherein the diffusion relationship represents a correspondence relationship between the point source position and projection data in the projection direction; and
   reconstructing a PET image according to the diffusion relationship.

2. The method according to claim 1, wherein the first diffusion distribution conforms to a Gaussian distribution.

3. The method according to claim 1, wherein the second diffusion distribution conforms to a Gamma distribution.

4. The method according to claim 1, wherein obtaining the first diffusion expression comprises:
   performing an integration on a region of the first crystal for a product of the first diffusion distribution and the second diffusion distribution.

5. The method according to claim 4, wherein the region of the first crystal comprises:
   a first region, which is a first projection area of the first crystal in a direction vertical to an incident direction of a photon, the first incident point being an origin of the first projection area; and
   a second region, which is a second projection area of the first crystal in an incident direction of a photon, the first incident point being an origin of the second projection area.

6. The method according to claim 1, wherein obtaining the second diffusion expression comprises:
   performing an integration on a region of the second crystal for a product of the first diffusion distribution and the second diffusion distribution.

7. The method according to claim 6, wherein the region of the second crystal comprises:
   a third region, which is a third projection area of the second crystal in a direction vertical to an incident direction of a photon, the second incident point being an origin of the third projection area; and
   a fourth region, which is a fourth projection area of the second crystal in an incident direction of a photon, the second incident point being an origin of the fourth projection area.

8. The method according to claim 1, further comprising:
obtaining a third diffusion distribution which represents a diffusion degree of a point source along a direction vertical to the projection direction and conforms to a Gaussian distribution;
obtaining a third diffusion expression according to the third diffusion distribution, wherein the third diffusion expression represents a diffusion degree of the point source in a fifth region, and the fifth region represents a diffusion region of the point source in a direction vertical to the projection direction; and
performing a correction on the diffusion relationship according to the third diffusion expression before the PET image is reconstructed.

9. The method according to claim 1, further comprising:
obtaining a probability expression of non-collimation of photon pair, wherein the probability expression conforms to a Gaussian distribution;
obtaining a fourth diffusion expression according to the probability expression, wherein the fourth diffusion expression represents a probability that the non-collimation affects an incident point of photon; and
performing a correction on the diffusion relationship according to the fourth diffusion expression before the PET image is reconstructed.

10. The method according to claim 1, further comprising:
obtaining a fifth diffusion expression by performing an integration on $\varphi/\pi$, wherein $\varphi$ is an emission angle of photon with respect to the projection direction; and
performing a correction on the diffusion relationship according to the fifth diffusion expression before the PET image is reconstructed.

11. A device for reconstructing a PET image, comprising:
a processor configured to execute machine readable instructions corresponding to a control logic for reconstructing a PET image stored on a storage medium such that when the machine readable instructions are executed, the processor is caused to:
obtain a first diffusion distribution and a second diffusion distribution, wherein the first diffusion distribution represents a diffusion degree of projection data along a direction vertical to an incident direction indicating a photon perpendicularly hitting onto a front surface of a crystal, and the second diffusion distribution represents a diffusion degree of projection data along an incident direction indicating a photon perpendicularly hitting onto a side surface of a crystal;
determine position information of a first crystal and a second crystal in a projection direction;
obtain a first diffusion expression according to the first diffusion distribution, the second diffusion distribution, a point source position and the position information of the first crystal, wherein the first diffusion expression represents a diffusion degree of projection data from a first incident point to the first crystal;
obtain a second diffusion expression according to the first diffusion distribution, the second diffusion distribution, the point source position and the position information of the second crystal, wherein the second diffusion expression represents a diffusion degree of projection data from a second incident point to the second crystal, and the first incident point and the second incident point are respectively two incident points corresponding to the point source position in the projection direction;
obtain a diffusion relationship according to the first diffusion expression and the second diffusion expression, wherein the diffusion relationship represents a correspondence relationship between the point source position and projection data in the projection direction; and
reconstruct a PET image according to the diffusion relationship.

12. The device according to claim 11, wherein the first diffusion distribution conforms to a Gaussian distribution.

13. The device according to claim 11, wherein the second diffusion distribution conforms to a Gamma distribution.

14. The device according to claim 11, wherein when obtaining the first diffusion expression, said machine readable instructions further cause the processor to:
perform an integration on a region of the first crystal for a product of the first diffusion distribution and the second diffusion distribution.

15. The device according to claim 14, wherein the region of the first crystal comprises:
a first region, which is a first projection area of the first crystal in a direction vertical to an incident direction of a photon, the first incident point being an origin of the first projection area; and
a second region, which is a second projection area of the first crystal in an incident direction of a photon, the first incident point being an origin of the second projection area.

16. The device according to claim 11, wherein when obtaining the second diffusion expression, said machine readable instructions further cause the processor to:
perform an integration on a region of the second crystal for a product of the first diffusion distribution and the second diffusion distribution.

17. The device according to claim 16, wherein the region of the second crystal comprises:
a third region, which is a third projection area of the second crystal in a direction vertical to an incident direction of a photon, the second incident point being an origin of the third projection area; and
a fourth region, which is a fourth projection area of the second crystal in an incident direction of a photon, the second incident point being an origin of the fourth projection area.

18. The device according to claim 11, wherein said machine readable instructions further cause the processor to:
obtain a third diffusion distribution, which represents a diffusion degree of a point source along a direction vertical to the projection direction and conforms to a Gaussian distribution;
obtain a third diffusion expression according to the third diffusion distribution, wherein the third diffusion expression represents a diffusion degree of the point source in a fifth region, and the fifth region represents a diffusion region of the point source in a direction vertical to the projection direction; and
perform a correction on the diffusion relationship according to the third diffusion expression before the PET image is reconstructed.

19. The device according to claim 11, wherein said machine readable instructions further cause the processor to:
obtain a probability expression of non-collimation of photon pair, wherein the probability expression conforms to a Gaussian distribution;
obtain a fourth diffusion expression according to the probability expression, wherein the fourth diffusion expression represents a probability that the non-collimation affects an incident point of photon; and perform a correction on the diffusion relationship according to the fourth diffusion expression before the PET image is reconstructed.

20. The device according to claim 11, wherein said machine readable instructions further cause the processor to:
obtain a fifth diffusion expression by performing an integration on $\varphi/\pi$, wherein $\varphi$ is an emission angle of photon with respect to the projection direction; and
perform a correction on the diffusion relationship according to the fifth diffusion expression before the PET image is reconstructed.

* * * * *